United States Patent [19]

Bostock

[11] Patent Number: 4,646,516
[45] Date of Patent: Mar. 3, 1987

[54] CATALYST ARRANGEMENT FOR THE EXHAUST SYSTEM OF AN INTERNAL COMBUSTION ENGINE

[75] Inventor: Philip G. Bostock, Hadleigh, England

[73] Assignee: Ford Motor Company, Dearborn, Mich.

[21] Appl. No.: 860,147

[22] Filed: May 6, 1986

[51] Int. Cl.$^4$ ............................ F01N 3/02; F01N 3/28
[52] U.S. Cl. ........................................ 60/295; 60/299; 60/302; 422/178
[58] Field of Search ................ 60/295, 299, 302; 422/178, 180

[56] References Cited

U.S. PATENT DOCUMENTS

| | | | |
|---|---|---|---|
| 3,370,419 | 2/1968 | Ketzer | 60/295 |
| 4,449,362 | 5/1984 | Frankenberg et al. | |
| 4,462,208 | 7/1984 | Hicks | 60/286 |
| 4,505,106 | 3/1985 | Frankenberg et al. | |

FOREIGN PATENT DOCUMENTS

| | | | |
|---|---|---|---|
| 725371 | 1/1966 | Canada | 60/295 |
| 2134407 | 8/1984 | United Kingdom | |
| 2098086 | 2/1985 | United Kingdom | |
| 2145349 | 3/1985 | United Kingdom | |

Primary Examiner—Douglas Hart
Attorney, Agent, or Firm—Joseph W. Malleck; Roger L. May

[57] ABSTRACT

An exhaust system for an internal combustion engine, the system having a particulate trap for trapping particulate emissions. A catalyst is incorporated and exposed to the exhaust gas flow to promote burning off the trap particulate material. The catalyst is incorporated as a solid material insert which is fitted in the exhaust gas system upstream of the particulate trap so that the hot exhaust gases pass over the insert on their way to the trap. In passing over the insert, the hot exhaust gases cause catalytic material to be vaporized from the surface of the insert and to be carried along in a gas stream towards the trap where they assist in promoting burning of the particulates. The solid material is comprised of catalytic substance and other materials which are effective to determine the overall thermal conductivity of the body, the other materials may be selected from the group consisting of ceramic, sintered metallic material having porosity to promote a low thermoconductivity, or nonmetallic high temperature organic thermosetting resin.

6 Claims, 5 Drawing Figures

CATALYST ARRANGEMENT FOR THE EXHAUST SYSTEM OF AN INTERNAL COMBUSTION ENGINE

BACKGROUND OF THE INVENTION

1. Technical Field

This invention relates to a catalyst arrangement for the exhaust system of an internal combustion engine and more particularly, but not exclusively, it is intended for use in the exhaust system of diesel engines.

2. Description of the Prior Art

In order to reduce the particulate emission levels, it is known to place a particulate filter trap in the exhaust system which captures a high proportion of the particulate material in the exhaust gas. The particulates are collected in a layer on the filter medium and consist predominantly of carbon and hydrocarbon material. The exhaust gas passes through the filter, through the exhaust system, and to atmosphere with a reduced quantity of particulates.

The particulate material builds up in the trap and restricts the flow of exhaust gas and generates a backpressure on the engine. A condition is reached where regeneration of the particulate trap is required which involves burning off of the deposit in a controlled way. This is achieved by increasing the temperature of the exhaust gas until combustion of the deposit is initiated. Burning continues until all, or most, of the particulate deposit is removed. The increase in exhaust temperature is achieved by operating the engine in a manner that causes a temperature increase (see U.S. Pat. No. 4,404,796) or by using an additional external heating device (see U.S. Pat. No. 4,544,388).

The temperature at which the particulate deposit begins to burn can be influenced by introducing a catalyst powder into the exhaust gas stream (see British Pat. Nos. 2,145,349 and 2,098,086) or by incorporating a catalyst coating on a support element adjacent the filter element (see U.S. Pat. Nos. 4,505,106 and 4,449,362, and British Pat. No. 2,134,407).

Unfortunately, the use of catalysts in this manner is not replenishable and, after consumption, requires complicated replacement of major portion of the regenerative trap.

SUMMARY OF THE INVENTION

A primary object of this invention is to provide an arrangement of the catalyst material and its supporting structure so that it can be more effectively used as a catalyst and more easily replenished.

According to the present invention, there is provided a catalyst arrangement for the exhaust system of an internal combustion engine having an exhaust conduit carrying hot exhaust gas flow from the engine in a particulate trap interposed in the exhaust gas flow, the arrangement comprising (i) a body of solid material incorporating a substance having catalytic properties and other materials effective to promote a low thermal conductivity for said body, and (ii) means for removably mounting the body in the exhaust system upstream of a particulate trap with a surface of the body exposed to exhaust gas flow, the composition and position of the body being such that, in use, hot exhaust gases flow over the surface of the body and release the catalytic substance from the body.

The body of solid material will be erodable and comsumable and will need to be replaced from time to time.

The catalytic substance is vaporized from the surface of the body of solid material by the exhaust gas heat. In order to obtain a temperature at the surface of the body for the desired vaporization, the thermal conductivity of the body itself must be controlled to be at a low level because the thermal conductivity will have an important effect on insuring an elevated surface temperature.

The substance having catalytic properties may be of any suitable known catalyst. Suitable active components are metals with catalytic properties such as copper, nickel, etc. The substance is combined with other materials to produce the body of solid material, other materials being adapted to determine the thermal conductivity of the body may comprise ceramic, sintered metallic material having porosity to promote a low thermal conductivity, or nonmetallic high temperature organic thermosetting resin.

DETAILED DESCRIPTION AND BEST MODE

Figure 1:
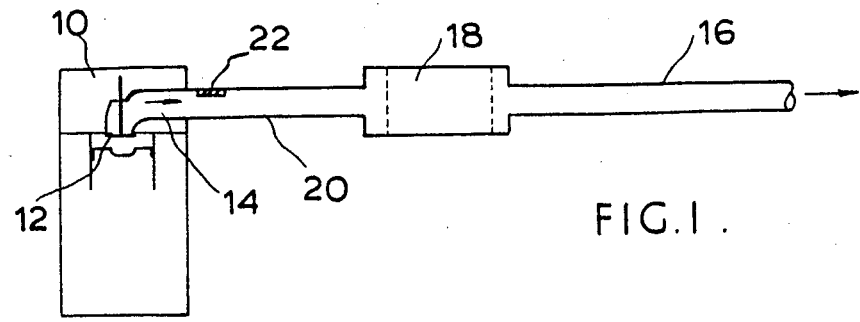
FIG. 1 is a schematic view of an engine and associated exhaust system.

FIG. 1 shows the cylinder head 10 of an engine with a valve 12 at the top of a cylinder, an exhaust gas outlet port 14, and an exhaust conduit 16. A particulate trap 18 is positioned in the exhaust conduit 16 to trap the particulates in the exhaust gas.

Upstream of the particulate trap 18, in the exhaust manifold 20, a solid material insert or body 22 is fitted. The material of this insert has catalytic properties.

Figure 2:
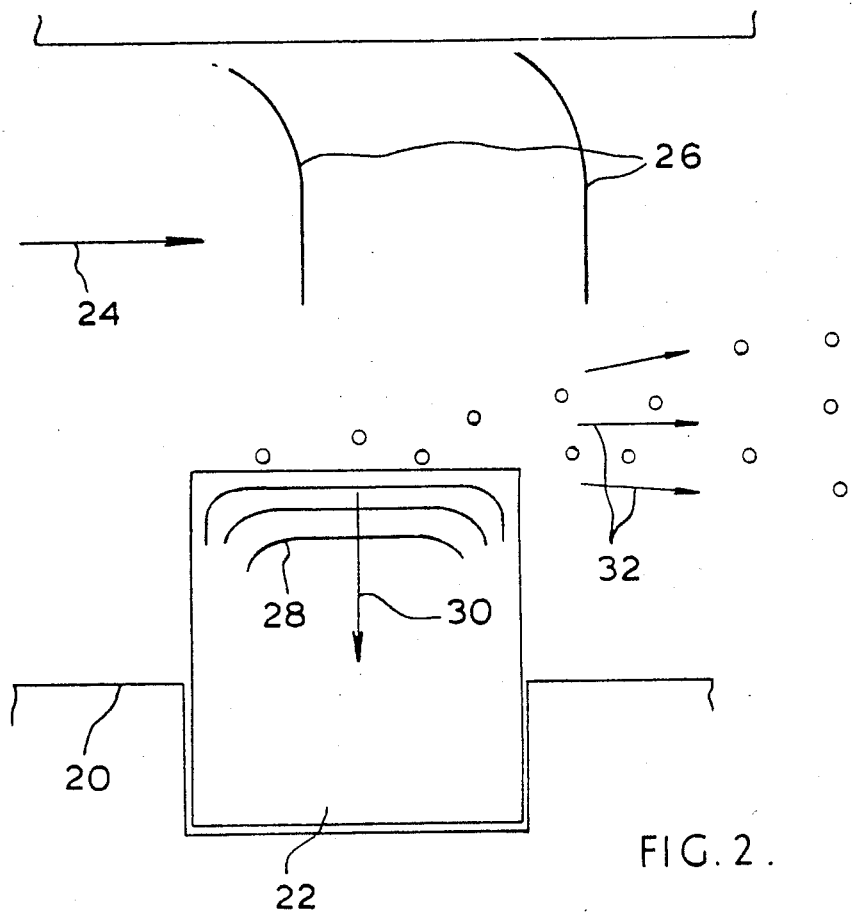
FIG. 2 illustrates the mechanism by which the arrangement of the invention operates.

FIG. 2 shows a section through the exhaust manifold 20, with the direction of exhaust gas flow being indicated by an arrow 24. The temperature gradient along the exhaust pipe is indicated by the lines 26, and the temperature gradients in the insert or body 22 are indicated by lines 28, and the direction of heat flow by an arrow 30.

As the exhaust gas flows over the surface of the body or insert 22, it vaporizes the catalytic substance which is then carried along by the exhaust gas stream as indicated by particulate flow 32. The vaporized substance is swept off the insert or body and mixes into the gas stream to distribute the active catalyst and to promote burning of the particulates collected in the trap 18.

Figure 3:
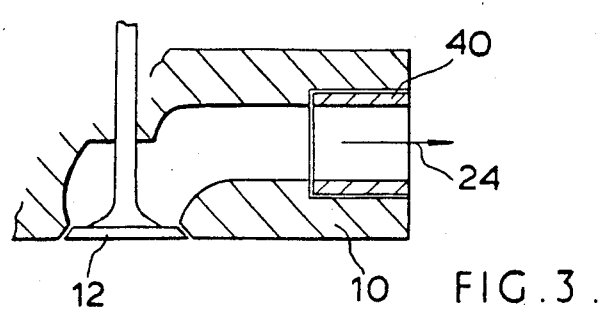
FIGS. 3, 4 and 5 show various alternative positions for a catalyst body in accordance with the invention.

FIG. 3 shows an insert or body 40 in the form of an annular ring or sleeve inserted into a recess at the point where the exhaust gas port 14 leaves the cylinder head 10.

Figure 4:
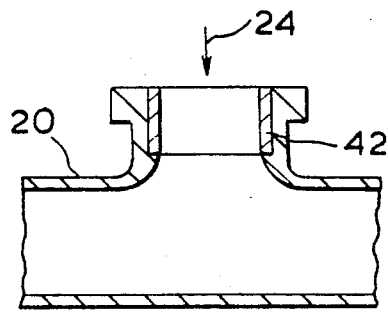

FIG. 4 shows a similar arrangement, but with an annular insert 42 positioned in the mouth of an exhaust manifold 20.

Figure 5:
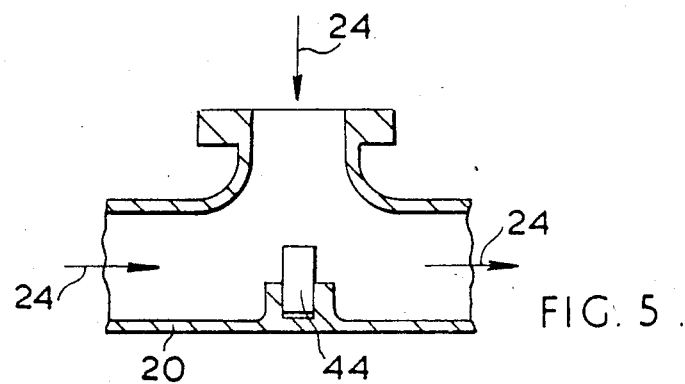

FIG. 5 shows another arrangement incorporated in the exhaust manifold 20 with an insert or body 44 inside the manifold 20 in a position where it will be exposed to exhaust gas flows from the various cylinders.

The actual position of the insert or body in the exhaust system will be determined by the temperature conditions that exist in the system upstream of the particulate trap and will be chosen to give a steady release of catalyst substance. The temperature at which this steady release will occur will also depend on the composition of the body or insert.

The thermal conductivity of the catalyst insert must be controlled so that sufficient heat is retained at the surface to promote vaporization of the active elements. The surface temperature is the critical parameter. Gas flows past the insert and heats the surface. Heat flows away from the surface through the insert at a rate which controls the surface temperature. The vaporized substance is swept off the insert and mixes into the gas stream to distribute the active catalyst. If the insert gets too hot, it may melt. If it becomes too cold, it may not release sufficient catalyst.

The other materials combined with the substance having catalyst properties can be ceramic, sintered metallic material having porosity to promote a low thermal conductivity, or nonmetallic high temperature organic thermosetting resin. Such other materials must prevent a high flow of heat through the body and away from the erodable or consumable surface. In this manner, the temperature at the surface is properly controlled to promote vaporization.

As the body of solid material is eroded or consumed, the insert becomes so expended that it must be replaced at regular service intervals. The insert may be retained in the engine by several means, depending upon the specific engine design requirements, in a manner that allows routine replacement and as indicated in the drawings.

While preferred embodiments of the invention have been illustrated and described, it will be noted that various changes and modifications may be made without departing from the invention, and it is intended to cover in the appended claims all such changes and modifications as fall within the true spirit and scope of the invention.

I claim:

1. A catalyst arrangement for the exhaust system of an internal combustion engine having an exhaust conduit carrying hot exhaust gas flow from the engine and a particulate trap interposed in the exhaust gas flow, the arrangement comprising:

(i) a body of solid material incorporating a substance having catalytic properties and other materials effective to promote a low thermal conductivity for said body; and (ii) means for removably mounting the body in the exhaust system upstream of a particulate trap with a surface of the body exposed to exhaust gas flow, the composition and position of the body being such that, in use, hot exhaust gases flow over the surface of the body and release the catalytic substance from the body.

2. An arrangement as in claim 1, wherein the catalytic substance is vaporized from the surface of the body of solid material by the exhaust gas heat.

3. An arrangement as in claim 1, wherein the substance having catalytic properties comprises a metal with catalytic properties combined with said other materials, said other materials being selected from the group consisting of ceramic, sintered metallic material having porosity to promote a low thermal conductivity, and nonmetallic high temperature organic thermosetting resin.

4. An arrangement as in claim 1, wherein the body of solid material is located in a recess which opens into the face of the cylinder head which mates with the exhaust manifold of the engine.

5. An arrangement as in claim 1, wherein the body of solid material is located in a recess which opens into the face of the exhaust manifold and which mates with the cylinder head of the engine.

6. An arrangement as in claim 1, wherein the body of solid material is located in a recess in the exhaust manifold of the engine.

* * * * *